(12) United States Patent
Grebennikov et al.

(10) Patent No.: US 9,302,909 B2
(45) Date of Patent: Apr. 5, 2016

(54) NANOCOMPOSITE MATERIAL

(75) Inventors: Evgeny P. Grebennikov, Moscow (RU); Alexandr G. Devyatkov, Moscow (RU); Grigory E. Adamov, Tula (RU)

(73) Assignee: Evgeny P. Grebennikov, Moscow (RU)

( * ) Notice: Subject to any disclaimer, the term of this patent is extended or adjusted under 35 U.S.C. 154(b) by 263 days.

(21) Appl. No.: 12/975,925

(22) Filed: Dec. 22, 2010

(65) Prior Publication Data

US 2011/0166333 A1 Jul. 7, 2011

Related U.S. Application Data

(63) Continuation of application No. PCT/RU2008/000398, filed on Jun. 27, 2008.

(51) Int. Cl.
| | | |
|---|---|---|
| C09B 45/00 | (2006.01) | |
| B82Y 30/00 | (2011.01) | |
| C09K 11/02 | (2006.01) | |
| C09K 11/58 | (2006.01) | |
| C09K 11/88 | (2006.01) | |
| H01B 1/06 | (2006.01) | |
| H01B 1/10 | (2006.01) | |

(52) U.S. Cl.
CPC ............... *B82Y 30/00* (2013.01); *C09K 11/02* (2013.01); *C09K 11/025* (2013.01); *C09K 11/58* (2013.01); *C09K 11/883* (2013.01)

(58) Field of Classification Search
USPC ............. 424/9.42, 178.1, 617, 649; 436/525; 534/713; 977/773, 810, 834; 252/519.4, 582, 585, 586
See application file for complete search history.

(56) References Cited

U.S. PATENT DOCUMENTS

| | | | |
|---|---|---|---|
| 2002/0168756 A1* | 11/2002 | Kinoshita et al. | 435/287.2 |
| 2005/0064604 A1 | 3/2005 | Bohmann | |
| 2008/0003183 A1* | 1/2008 | Guo | 424/9.42 |

FOREIGN PATENT DOCUMENTS

| | | |
|---|---|---|
| RU | 2233791 C2 | 8/2004 |
| RU | 2332352 C1 | 8/2008 |
| RU | 2332352 C1 * | 8/2008 |
| WO | 2008020460 A1 | 2/2008 |

OTHER PUBLICATIONS

Deepti S. Sidhaye, Sudhir Kashyap, Murali Sastry, Srinivas Hotha,and, B. L. V. Prasad, Sidhaye, Gold Nanoparticle Networks with Photoresponsive Interparticle Spacings, Langmuir 2005, 21, 7979-7984. © 2005 American Chemical Society.*
Chunhua Luo, Fang Zuo, Zhaohui Zheng, Xu Cheng, Xiaobin Ding, Yuxing Peng, Tunable Smart Surface of Gold Nanoparticles Achieved by Light-Controlled Molecular Recognition Effection, Macromol. Rapid Commun. 2008, 29, 149-154. 2008 WILEY-VCH Verlag GmbH & Co. KGaA, Weinheim.*
Binil Itty Ipe, S. Mahima, and K. George Thomas, Light-Induced Modulation of Self-Assembly on Spiropyran-Capped Gold Nanoparticles: A Potential System for the Controlled Release of Amino Acid Derivatives, J. Am. Chem. Soc. 2003, 125, 7174-7175. © 2003 American Chemical Society.*
Masayuki Suda, Masaru Nakagawa, Tomokazu Iyoda, and Yasuaki Einaga, Reversible Photoswitching of Ferromagnetic FePt Nanoparticles at Room Temperature, J. Am. Chem. Soc. 2007, 129, 5538-5543, © 2007 American Chemical Society.*
Rafal Klajn, Kyle J. M. Bishop, Marcin Fialkowski, Maciej Paszewski, Christopher J. Campbell, Timothy P. Gray, Bartosz A. Grzybowski, Plastic and Moldable Metals by Self-Assembly of Sticky Nanoparticle Aggregates Science vol. 316 Apr. 13, 2007 261-264.*
Violetta Ferri, Mark Elbing, Giuseppina Pace, Michael D. Dickey, Michael Zharnikov, Paolo Samori, Marcel Mayor, and Maria Anita Rampi, Light-Powered Electrical Switch Based on Cargo-Lifting Azobenzene Monolayers, Angew. Chem. Int. Ed. 2008, 47, 3407-3409, 2008 WILEY-VCH Verlag GmbH & Co. KGaA, Weinheim.*

\* cited by examiner

*Primary Examiner* — Bijan Ahvazi
(74) *Attorney, Agent, or Firm* — Patentbar International, P.C.

(57) ABSTRACT

The invention relates to nanotechnology and is directed at nanocomposite materials with effectively controllable optical properties which can be used in non-linear optics, information engineering, for designing optical memory means etc. The inventive nanocomposite material comprises nanoparticles, intermediate bonding molecule particles which modify the space configuration when they are exposed to an external light action, and bondable molecule particles which exhibit the optical properties near nanoparticles, wherein the nanoparticles, intermediate bonding molecules and bondable molecules are connected in series so as to form a three-dimensional cluster structure. Moreover, the intermediate bonding molecule particles which modify the space configuration when they are exposed to an external light action can contain additional inclusions in the form of functional substituents which enhance the bonding properties thereof.

8 Claims, No Drawings ously applied for from the known art, and is determined by the presence in the nanocomposite materials of intermediate bonding molecules—particles whose spatial configuration, primarily length, is modified on exposure to light at certain wavelengths, and accordingly, the distance between the nanoparticles, close to which are localized strong electromagnetic fields—and by bondable molecules, particles with optical properties that are efficiently manifested/modified close to the nanoparticles. At the same time, a change in distribution occurs—a distortion of the electromagnetic field of the bondable molecules, par-

NANOCOMPOSITE MATERIAL

RELATED APPLICATIONS

This Application is a Continuation application of International Application PCT/RU2008/000398 filed on Jun. 27, 2008, which is incorporated herein by reference in its entirety.

FIELD OF THE INVENTION

The invention relates to nanotechnology and is directed toward the creation of nanocomposite materials with effectively controllable optical properties which can be used in non-linear optics, information technology, optical memory media design, and so forth.

BACKGROUND OF THE INVENTION

Nanocomposite materials based on nanoparticles in combination with bonding components (RU 2224710 C2, B82B3/00, 2004; RU 2233791 C2, B82B3/00, 2004; RU 2288167 C2, B82B1/00, 2004) are known from pertinent art. However, the qualitative composition of the ingredients of the known nanocomposite materials do not contain particles with modifiable optical properties; this does not permit control of their optical properties such as luminescence, and limits the functional and manufacturing process possibilities of nanocomposite materials.

SUMMARY OF THE INVENTION

The invention is directed toward the creation of a nanocomposite material with expanded functional possibilities, with the capacity to efficiently modify its optical properties under an external effect, primarily in the form of light radiation.

The solution of the objective posed is provided by the fact that in the nanocomposite materials based on nanoparticles, according to the invention, the structure of the nanocomposite material additionally contains intermediate bonding molecules—particles modifying their spatial configuration on external light exposure—and bondable molecules—particles exhibiting optical properties in the vicinity of the nanoparticles—where the nanoparticles, intermediate bonding molecules, and bondable molecules are connected in series, with the formation of a three-dimensional cluster structure.

Moreover, the intermediate bonding molecules—particles of nanocomposite material which modify their spatial configuration on external light exposure—can contain additional inclusions, functional substituents which enhance the bonding properties thereof.

The technical result, which consists in the creation of nanocomposite materials with expanded functional possibilities—the capacity to effectively modify their optical properties on external light exposure (and, correspondingly, in the expansion of the arsenal of technical means for a specific purpose—of nanocomposite materials)—does not follow from the known art, and is determined by the presence in the nanocomposite materials of intermediate bonding molecules—particles whose spatial configuration, primarily length, is modified on exposure to light at certain wavelengths, and accordingly, the distance between the nanoparticles, close to which are localized strong electromagnetic fields—and by bondable molecules, particles with optical properties that are efficiently manifested/modified close to the nanoparticles. At the same time, a change in distribution occurs—a distortion of the electromagnetic field of the bondable molecules, particles with optical properties—that causes a change in the lifetime of excited atoms and molecules of the latter, affects the rate of electron transitions that govern the processes of absorption and spontaneous radiation of light, and accordingly leads to a reversible alteration of the spectral characteristics and optical properties of said nanocomposite materials as a whole.

VARIANTS OF EMBODIMENT OF THE INVENTION

Metallic (for example, gold), semiconductor, or dielectric nanoparticles of spherical, ellipsoidal, acicular, bar-shaped, pyramidal, or other form in which the greatest efficiency of modification of the properties of the bondable molecules is achieved, may be used as nanoparticles of the nanocomposite materials in the implementation of the method applied for.

Particles with luminescent, photochromic, polarizing, or other optical properties that are efficiently manifested/modified close to the nanoparticles (such as cadmium selenide) may be used as bondable molecules.

Particles that change their spatial configuration (for example, isomerize) on external light exposure at a certain wavelength (photoinduced transition)—primarily organic molecules with a double bond of the carbon-carbon, carbon-nitrogen, or nitrogen-nitrogen type, and others capable of cis-trans isomerization (for example, azo dye molecules)—or on exposure to an electromagnetic field (electrochromic transition), may be used as bonding molecules, which through the formation of chemical bonds provide stability of the nanostructure.

Functional substituents that enhance the bonding properties of intermediate bonding molecules, for example, an amino group (—NH2), aldehyde (—CHO), thio group (—SH), carboxyl (—COOH), or hydroxyl (—OH), or other groupings containing these groups may be used as additional inclusions.

The nanocomposite material is obtained in the following manner.

Bonding molecules containing two thio groups of the azo dye particle 4,4'-dithiomethyl azobenzene, that change their spatial configuration as a result of transition from the trans state to the cis state on exposure to radiation at a wavelength of 365 nm, and the reverse transition on exposure to visible light at a wavelength of 435 nm, wherein the length of the molecule—an azo dye particle—changes from 9.5 nm to 5.5 nm and back, are introduced in a 1:12 ratio into an aqueous suspension, for example, of nanoparticles of colloidal gold, 12-15 nm in diameter. Upon mixing, a ligand envelope of bonding molecules, particles of the azo dye, forms on the surface of the nanoparticles of gold. To the system thus obtained, and in the same 1:12 ratio to the gold nanoparticles, is added an aqueous suspension of bondable molecules, colloidal particles of cadmium selenide (CdSe), on the optical properties of which the gold nanoparticles exert an effective influence (at a distance between the CdSe particles and the gold nanoparticles up to 10 nm, a maximum intensification of the photoluminescence of the CdSe particle up to 5-fold is provided, while at small distances on the order of 2-5 nm, the photoluminescence is suppressed due to resonant energy transfer from the photoexcited quantum particles of CdSe to the metal particles, i.e., the gold nanoparticles). In the process, deposition on the free thio groups of the ligand envelope of gold nanoparticles of the bondable molecules, particles of cadmium selenide, takes place, with the formation of macromolecules that form a three-dimensional cluster structure of nanocomposite material. The prepared suspension of nanocomposite material is placed on a mirror glass support and dried until the formation of a nanocomposite film.

In the process of controlling the optical properties, the nanocomposite material obtained is irradiated for several seconds with radiation at a wavelength of 365 nm, which converts all bonding molecules, azo dye particles, to the cis state, in which the distance between the gold nanoparticles and the bondable molecules, particles of cadmium selenide (CdSe), is 9.5 nm. This, upon excitation (irradiation) of the nanocomposite material by light at a wavelength of 530 nm, generates intense red luminescence at a wavelength of approximately 670 nm that corresponds to the direct interband transition of the bondable molecules, particles of cadmium selenide. In order to modify the optical properties, nanocomposite material capable of intense luminescence is irradiated for several seconds with by light with peak radiation close to 435 nm; this leads to isomerization of the bonding molecules, azo dye particles, (thus to conversion of the molecules, azo dye particles, to the trans state) and to a decrease in the distance between the gold nanoparticles and the bondable molecules, particles of cadmium selenide, to 5.5 nm. Here, the subsequent excitation of the nanocomposite material by light at a wavelength of 530 nm generates luminescence, but its intensity is decreased by a factor of several tens. With repeated irradiation by light at a wavelength of 365 nm, the capacity of the nanocomposite material for intense red luminescence on exposure to exciting radiation at a wavelength of 530 nm is completely restored.

The nanocomposite material structure applied for may be used as a means for optical recording and information readout owing to the possibility of effective and point-wise control of optical properties in the following manner.

The nanocomposite material is preliminarily uniformly irradiated by light at a wavelength of 435 nm, which converts the bonding molecules, azo dye particles, to the trans state. Then this nanocomposite material, characterized by low intensity of luminescence, is irradiated by point-wise flash exposure through a mask, for example, with 0.3 mm diameter openings, for a tenth of a second by focused radiation at a wavelength of 365 nm, which converts the bonding molecules, azo dye particles, to the cis state only at places that correspond to the distribution of the openings in the mask and are subjected to irradiation. With uniform excitation of the nanocomposite material by light at a wavelength of 530 nm, a point pattern of luminescence appears, precisely replicating the mask. Such a point pattern of luminescence replicating the mask is kept in darkness for an unlimited time, and can be reproduced at any time by excitation at a wavelength of 530 nm, or erased by subsequent uniform flash exposure with radiation at a wavelength of 365 nm or 435 nm.

What is claimed is:

1. A nanocomposite structure, comprising:
   a support; and
   a film of nanocomposite material disposed on the support and formed from a dried aqueous suspension including:
   first nanoparticles formed from first material(s) having modifiable optical properties using exposure of the nanocomposite structure to optical irradiation at pre-determined wavelengths or to pre-determined electromagnetic fields;
   second nanoparticles formed from second material(s) capable of affecting the modifiable optical properties of the first nanoparticles; and
   third particles formed from third material(s) which modify their spatial configuration via cis-trans isomerization or electrochromic transition, and are directly connected to the first nanoparticles and second nanoparticles, thereby forming a three-dimensional cluster structure;
   wherein the first material(s) are colloidal particles of cadmium selenide (CdSe); and
   wherein the third material(s) (i) have molecules with double carbon-carbon bonds, carbon nitrogen or nitrogen-nitrogen bonds, or (ii) include thio groups having azo dye molecules.

2. The nanocomposite structure according to claim 1, wherein the first material(s) further include additives selected from the group consisting of amino group materials (—NH2), aldehyde group materials (—CHO), thio group materials (—SH), carboxyl group materials (—COOH), and hydroxyl group materials (—OH).

3. The nanocomposite structure according to claim 1, wherein the modifiable optical properties of the first nanoparticles include luminescent, photochromic or polarizing properties.

4. The nanocomposite structure according to claim 1, wherein the second material(s) are selected from the group consisting of metals, semiconductors, and dielectrics.

5. The nanocomposite structure according to claim 1, wherein the second material(s) include gold (Au).

6. The nanocomposite structure according to claim 1, wherein the third material(s) include azo dye.

7. The nanocomposite structure according to claim 1, wherein the support is a mirror glass substrate.

8. The nanocomposite structure according to claim 1, wherein:
   the support is a mirror glass substrate;
   the first material is colloidal particles of cadmium selenide (CdSe);
   the second material is gold (Au);
   the third material is 4,4'-dithiomethyl azobenzene;
   cross-sectional dimensions of the first and third nanoparticles are about 9 nm;
   cross-sectional dimensions of the second nanoparticles are about 12-15 nm;
   a ratio between the third and second nanoparticles in the suspension is 1:12 by weight;
   a ratio between the first and second nanoparticles in the suspension is 1:12 by weight; and
   the pre-determined wavelengths of the optical irradiation are 365 nm, 435 nm, or 530 nm.

* * * * *